United States Patent
Tulovic

(10) Patent No.: US 9,815,124 B1
(45) Date of Patent: Nov. 14, 2017

(54) HOLE SAW WITH THREADABLY REMOVABLE PORTION

(71) Applicant: Flamur Tulovic, Brooklyn, NY (US)

(72) Inventor: Flamur Tulovic, Brooklyn, NY (US)

( * ) Notice: Subject to any disclaimer, the term of this patent is extended or adjusted under 35 U.S.C. 154(b) by 36 days.

(21) Appl. No.: 15/077,094

(22) Filed: Mar. 22, 2016

(51) Int. Cl.
*B23B 51/04* (2006.01)

(52) U.S. Cl.
CPC ........ *B23B 51/0453* (2013.01); *B23B 51/044* (2013.01); *B23B 51/0473* (2013.01); *B23B 2251/428* (2013.01); *B23B 2251/60* (2013.01)

(58) Field of Classification Search
CPC .............. B23B 51/0453; B23B 51/044; B23B 51/0473; B23B 51/04; B23B 2251/02; B23B 2251/428; B23B 2251/60; B23B 2251/603
See application file for complete search history.

(56) References Cited

U.S. PATENT DOCUMENTS

| | | | |
|---|---|---|---|
| 5,435,672 A * | 7/1995 | Hall ................... | B23B 51/0453 408/204 |
| D634,343 S | 3/2011 | Burke, III | |
| 8,721,236 B2 | 5/2014 | Kazda | |
| 2010/0080665 A1 | 4/2010 | Keightley | |
| 2011/0052340 A1 | 3/2011 | Kozak | |
| 2011/0177472 A1* | 7/2011 | Lee ..................... | A61B 17/1688 433/114 |
| 2011/0255931 A1 | 10/2011 | Murdie | |
| 2012/0009032 A1 | 1/2012 | Grussenmeyer | |
| 2013/0280000 A1 | 10/2013 | Frey | |

FOREIGN PATENT DOCUMENTS

CN          203664768          6/2014

* cited by examiner

*Primary Examiner* — Alan Snyder

(57) ABSTRACT

The hole saw with threadably removable portion is an improved hole saw that includes a removable portion that is able to slide back and forth with respect to an outer drill bit. The outer drill bit includes internal threadings along an inner surface, which correspond with external threadings provided on an outer surface of the removable portion. When the hole saw has bored a hole into an object, a core remains inside of the outer drill bit. The rotation of the drill rotates the removable portion with respect to the outer drill bit in order to push the core out of the outer drill bit. The outer drill bit includes a shoulder, which works in concert with the removable portion so as to lock the components together when in use as a hole saw.

4 Claims, 5 Drawing Sheets

HOLE SAW WITH THREADABLY REMOVABLE PORTION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of hole saw drill bits, more specifically, a hole saw drill bit that has a threaded portion that is able to slide forward of the outer drill bit in order to expel a core from the outer drill bit.

SUMMARY OF THE INVENTION

The hole saw with threadably removable portion is an improved hole saw that includes a removable portion that is able to slide back and forth with respect to an outer drill bit. The outer drill bit includes internal threadings along an inner surface, which correspond with external threadings provided on an outer surface of the removable portion. When the hole saw has bored a hole into an object, a core remains inside of the outer drill bit. The rotation of the drill rotates the removable portion with respect to the outer drill bit in order to push the shoulder, which works in concert with the removable portion so as to lock the components together when in use as a hole saw. The removable portion is affixed to an arbor nut. The arbor nut is affixed to both an arbor shaft and a pilot bit. The arbor shaft is adapted to engage a chuck of a drill, whereas the pilot bit is adapted to drill a hole prior to engagement via the outer drill bit.

These together with additional objects, features and advantages of the hole saw with threadably removable portion will be readily apparent to those of ordinary skill in the art upon reading the following detailed description of presently preferred, but nonetheless illustrative, embodiments of the hole saw with threadably removable portion when taken in conjunction with the accompanying drawings.

In this respect, before explaining the current embodiments of the hole saw with threadably removable portion in detail, it is to be understood that the hole saw with threadably removable portion is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hole saw with threadably removable portion.

It is therefore important that the claims be regarded as including such equivalent construction insofar as they do not depart from the spirit and scope of the hole saw with threadably removable portion. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
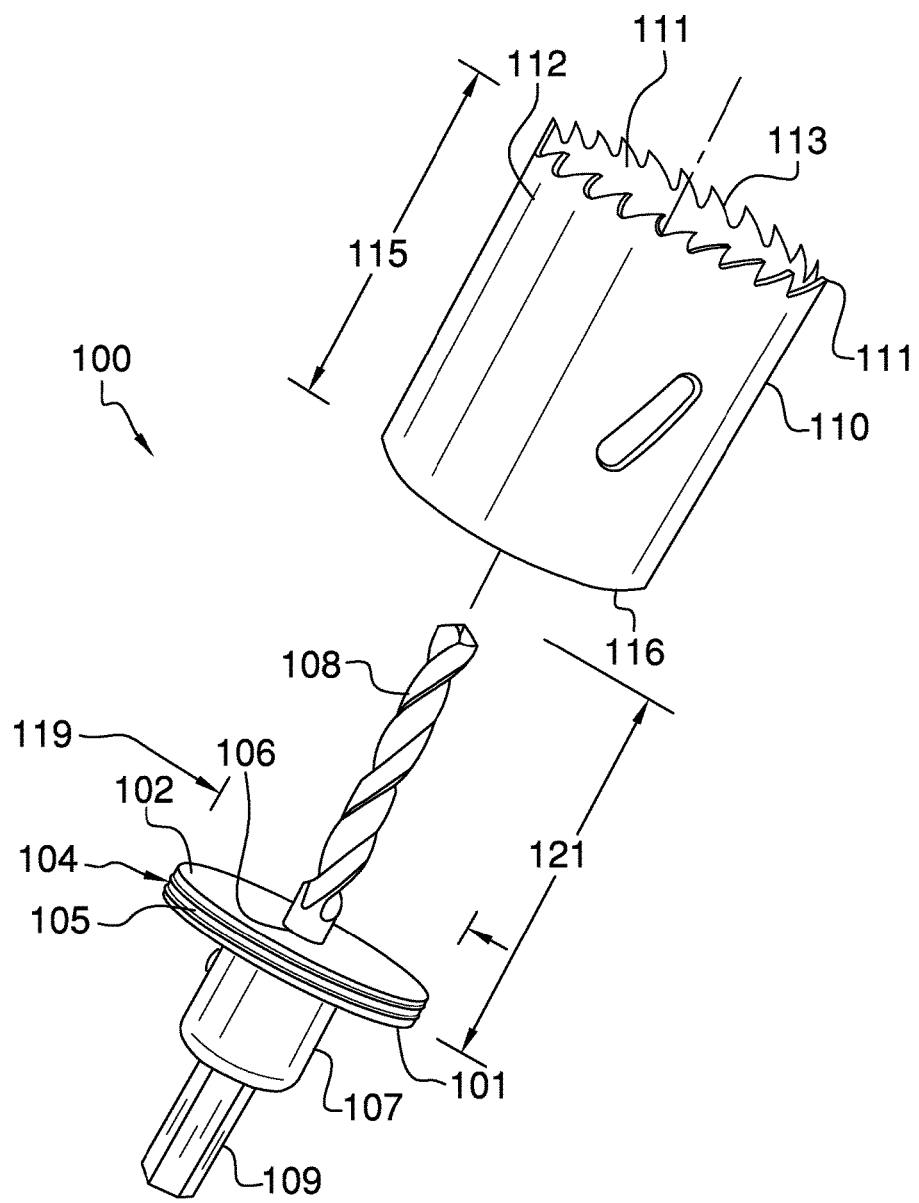
FIG. 1 is an exploded, perspective view of an embodiment of the disclosure.
Figure 2:
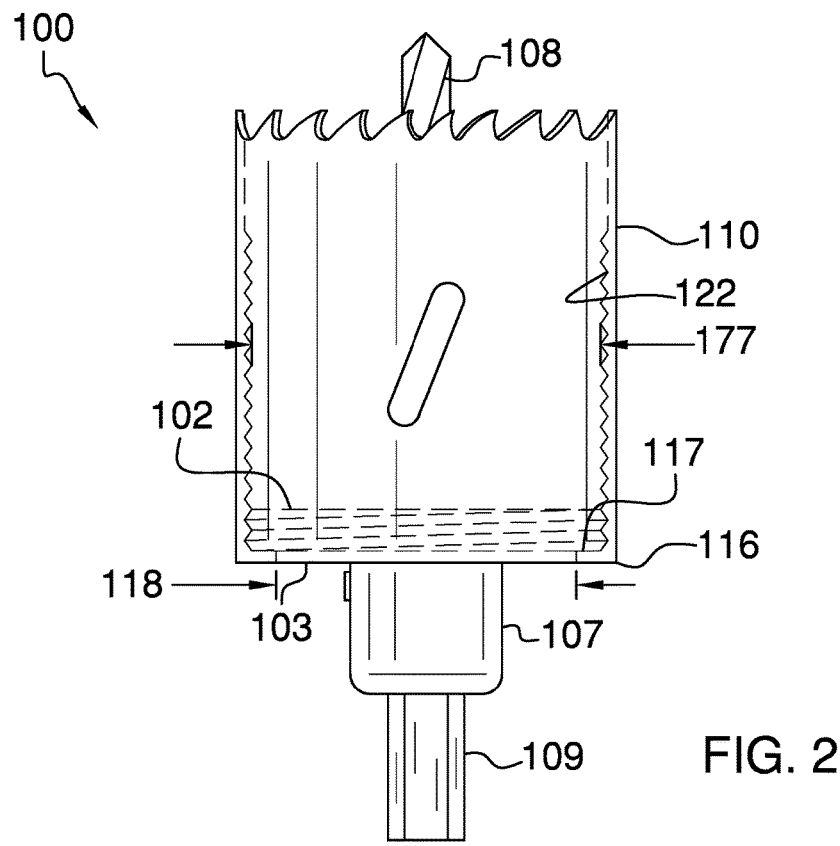
FIG. 2 is a side view of an embodiment of the disclosure.
Figure 3:
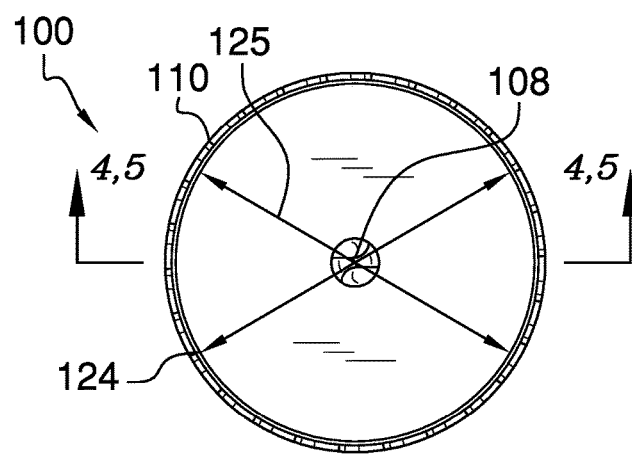
FIG. 3 is an end view of an embodiment of the disclosure.
Figure 4:
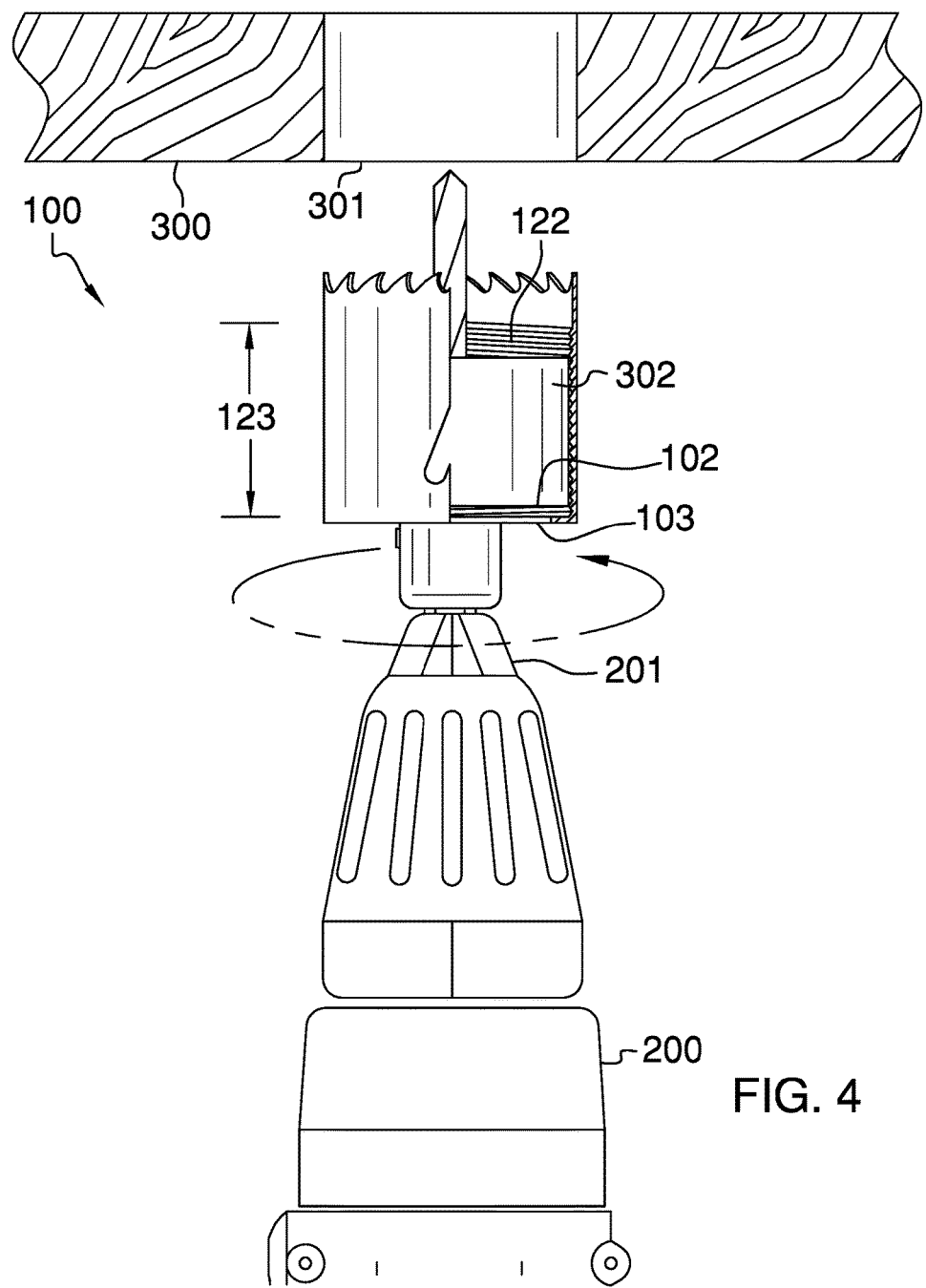
FIG. 4 is a cross-sectional view of an embodiment of the disclosure along line 4-4 in FIG. 3.
Figure 5:
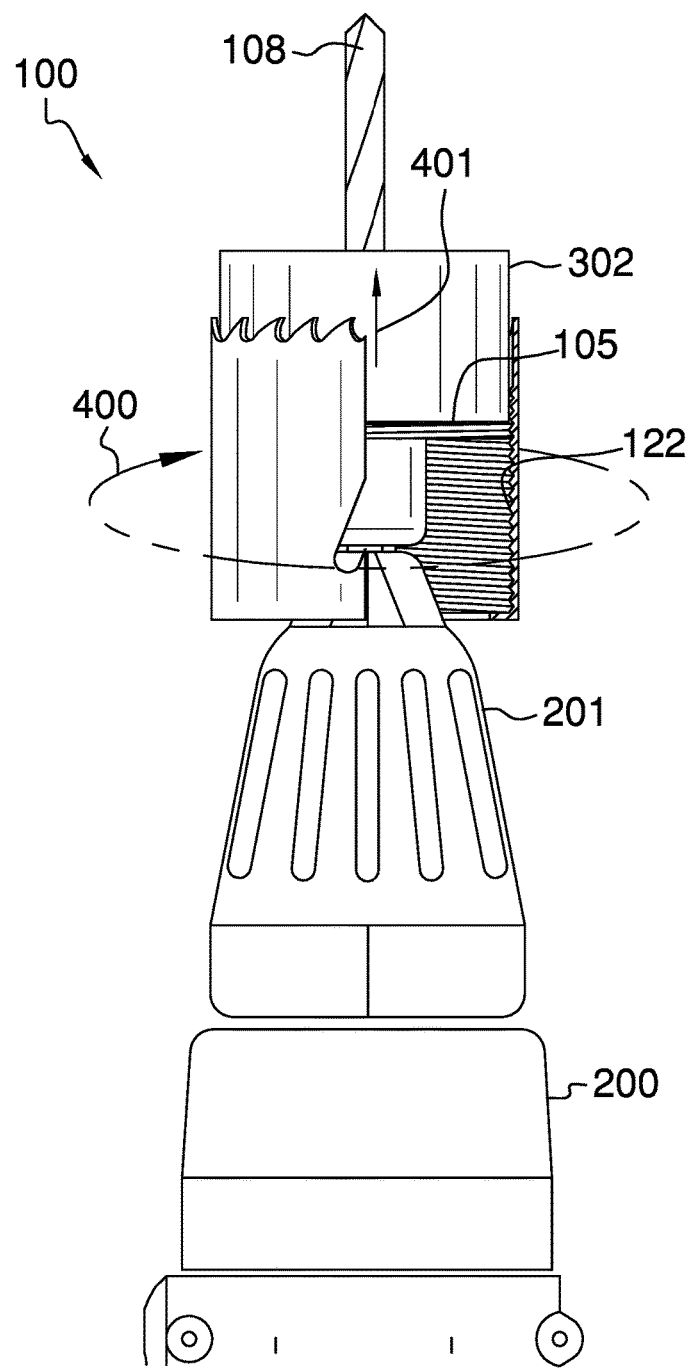
FIG. 5 is a second cross-sectional view of an embodiment of the disclosure along line 5-5 in FIG. 3.
Figure 6:
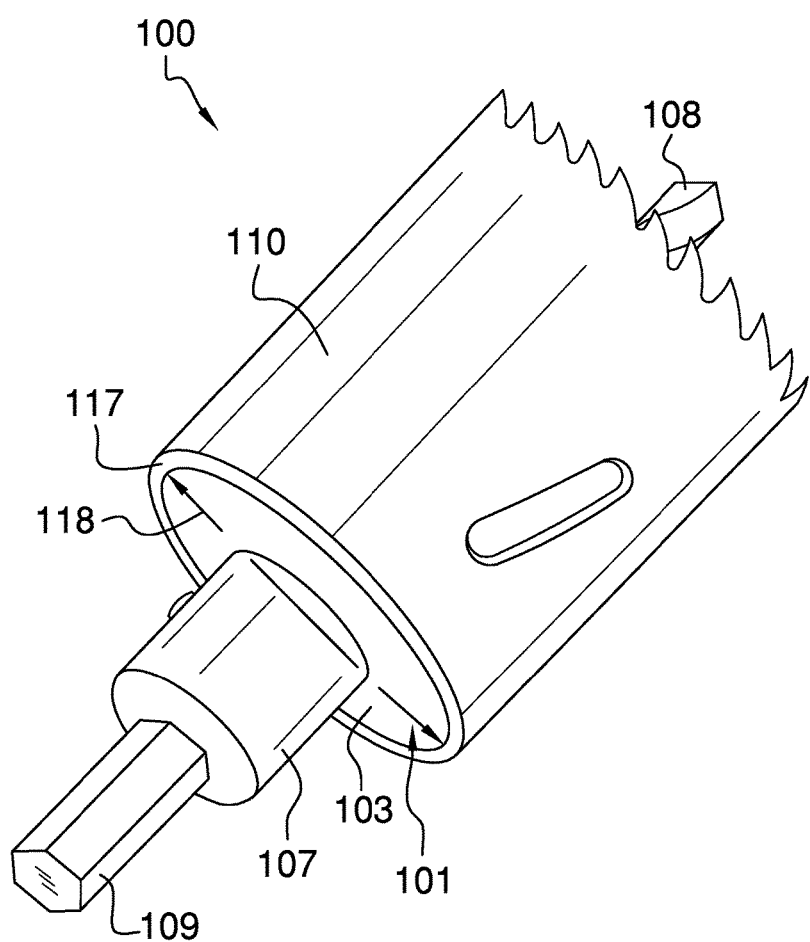
FIG. 6 is another perspective view of an embodiment of the disclosure.

As best illustrated in FIGS. 1 through 6, the hole saw with threadably removable portion 100 (hereinafter invention) generally comprises a removable portion 101 that is further defined with a first surface 102, a second surface 103, and a peripheral surface 104. The peripheral surface 104 includes external threading 105 thereon. The removable portion 101 is cylindrical in shape. The removable portion 101 includes a third hole 106 that is centrally positioned on the removable portion 101, and extends between the first surface 102 and the second surface 103.

The removable portion 101 is affixed to an arbor nut 107. The arbor nut 107 is affixed to a pilot bit 108. The pilot bit 108 extends through the third hole 106 of the removable portion 101. Moreover, the arbor nut 107 is affixed against the second surface 103 of the removable portion 101. The arbor nut 107 is also affixed to an arbor shaft 109. The arbor shaft 109 extends in a diametrically opposite direction with respect to the pilot bit 108. The arbor shaft 109 is adapted to be engaged with a chuck 201 of a drill 200. The arbor shaft 109 is hexagonal in shape, and which is well known in the art of drills, especially, hole saw drill bits.

The invention 100 includes an outer drill bit 110. The outer drill bit 110 is further defined as a cylinder in shape, and includes an inner bit surface 111 as well as an outer bit surface 112. The outer drill bit 110 includes bit teeth 113 at a fourth distal end 114 of the outer drill bit 110. The outer drill bit 110 has a bit length 115 that spans between the fourth distal end 114 and a fifth distal end 116.

The outer drill bit 110 includes a shoulder 117 that is provided adjacent to the fifth distal end 116. Moreover, the shoulder 117 extends inwardly from the inner bit surface 111 at the fifth distal end 116. The shoulder 117 works as a stop to prevent the removable portion 101 from exiting the fifth distal end 116 of the outer drill bit 110. The shoulder 117 is further defined with an inner shoulder diameter 118 that is less than a removable, outer diameter 119 of the removable portion 101. The shoulder 117 ensures that the removable portion 101 and the outer drill bit 110 move in concert with one another. The inner shoulder diameter 118 is also less than an inner drill bit diameter 177 of the outer drill bit 110. That being said, the removable, outer diameter 119 of the removable portion 101 is consistent with the inner drill bit diameter 177 of the outer drill bit 110 such that the removable portion 101 is able to screw up or down within the outer drill bit 110.

The pilot bit 108 has a pilot bit length 121, which is greater than the bit length 115 of the outer drill bit 110. In use, the pilot bit 108 is adapted to first engage a surface 300 to be bored. The outer drill bit 110 is adapted to secondly engage the surface 300 in order to bore a hole 301 therein.

The hole 301 bored from the surface 300 generates a core 302, which usually is nested within the outer drill bit 110. The core 302 is extracted from the outer drill bit 110 upon driving the removable portion 102 from the shoulder 117 at the fifth distal end 116 of the outer drill bit 110 to the fourth distal end 114 of the outer drill bit 110 (see FIG. 5). The movement of the removable portion 102 from the fifth distal end 116 to the fourth distal end 114 is accomplished upon manually grasping the outer drill bit 110 and reversing a rotational direction 400 of the drill 200. Upon reversing the rotational direction 400, the removable portion 101 moves upwardly 401 with respect to the outer drill bit 110 via the external threading 105 of the removable portion 101 and inner threading 122 provided on the inner bit surface 111 of the outer drill bit 110.

It shall be noted that the inner threading 122 of the outer drill bit 110 may span the entire inner bit surface 111 or a portion thereof. Moreover, the inner threading 122 extends from the fifth distal end 116 of the outer drill bit 110 to a threading depth 123. The threading depth 123 may be less than the bit length 115. It shall be noted that no mention is being made as to a diameter of the pilot bit 108. Moreover, the outer drill bit 110 may come in a plurality of sizes, and the drill bit inner diameter 177 of the outer drill bit 110 shall correspond with an outer diameter 125 of the removable portion 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hole saw with a threadably removable portion comprising:
   a removable portion that is able to move back and forth within an outer drill bit in order to adaptively remove a core taken from within the outer drill bit where said outer dill bit is adapted to drill a hole in a surface;
   wherein the removable portion is further defined with a first surface, a second surface, and a peripheral surface;
   wherein the peripheral surface includes external threading thereon;
   wherein the removable portion is cylindrical in shape;
   wherein the removable portion includes a first hole that is centrally positioned on the removable portion, and extends between the first surface and the second surface;
   wherein the removable portion is affixed to an arbor nut;
   wherein the arbor nut is affixed to a pilot bit;
   wherein the pilot bit extends through the first hole of the removable portion;
   wherein the arbor nut is affixed against the second surface of the removable portion;
   wherein the arbor nut is also affixed to an arbor shaft;
   wherein the arbor shaft extends in a diametrically opposite direction with respect to the pilot bit;
   wherein the arbor shaft is adapted to be engaged with a chuck of a drill;
   wherein the arbor shaft is hexagonal in shape;
   wherein the outer drill bit is further defined as a cylinder in shape, and includes an inner bit surface as well as an outer bit surface;
   wherein the outer drill bit includes bit teeth at a first distal end of the outer drill bit;
   wherein the bit teeth of the outer drill bit are adapted to engage against said surface in order to adaptively drill said hole into said surface;
   wherein the outer drill bit has a bit length that spans between the first distal end and a second distal end;
   wherein the outer drill bit includes a shoulder that is provided adjacent to the second distal end;
   wherein the shoulder extends inwardly from the inner bit surface at the second distal end;
   wherein the shoulder works as a stop to prevent the removable portion from exiting the second distal end of the outer drill bit;
   wherein the shoulder is further defined with an inner shoulder diameter that is less than a removable, outer diameter of the removable portion;
   wherein the shoulder ensures that the removable portion and the outer drill bit move in concert with one another;
   wherein the inner shoulder diameter is also less than an inner drill bit diameter of the outer drill bit;
   wherein the removable, outer diameter of the removable portion is consistent with the inner drill bit diameter of the outer drill bit such that the removable portion is able to screw up or down within the outer drill bit;
   wherein the pilot bit has a pilot bit length, which is greater than the bit length of the outer drill bit;
   wherein the pilot bit is adapted to engage the surface to be drilled before the outer drill bit;
   wherein the outer drill bit is adapted to secondly engage the surface in order to bore the hole therein;
   wherein the removable portion is adapted to remove the core from within the outer drill bit upon driving the removable portion from the shoulder at the second distal end of the outer drill bit to the first distal end of the outer drill bit;

wherein the movement of the removable portion from the second distal end to the first distal end is accomplished upon manually grasping the outer drill bit and reversing a rotational direction of the drill;

wherein upon reversing the rotational direction of the drill, the removable portion moves upwardly with respect to the outer drill bit via the external threading of the removable portion and inner threading provided on the inner bit surface of the outer drill bit.

2. The hole saw with a threadably removable portion according to claim 1 wherein the inner threading of the outer drill bit spans up to an entire inner bit surface of the outer drill bit.

3. The hole saw with a threadably removable portion according to claim 2 wherein the inner threading extends from the second distal end of the outer drill bit to a threading depth.

4. The hole saw with a threadably removable portion according to claim 3 wherein the threading depth is equal to or less than the bit length.

\* \* \* \* \*